US006498563B1

(12) United States Patent
Tice et al.

(10) Patent No.: US 6,498,563 B1
(45) Date of Patent: *Dec. 24, 2002

(54) SYNCHRONIZED COMMUNICATION SYSTEM (75) Inventors: Lee D. Tice, Bartlett, IL (US); Robert J. Clow, Aurora, IL (US); Manley S. Keeler, Naperville, IL (US)

(73) Assignee: Pittway Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/421,385

(22) Filed: Oct. 20, 1999

Related U.S. Application Data (63) Continuation-in-part of application No. 09/184,409, filed on Nov. 2, 1998, now Pat. No. 6,384,723.

(51) Int. Cl.⁷ .......................... G08B 26/00; G05B 23/00
(52) U.S. Cl. ...................... 340/504; 340/505; 340/509; 340/512
(58) Field of Search ................. 340/505, 506, 340/512, 513, 514, 3.1, 3.2, 504

(56) References Cited

U.S. PATENT DOCUMENTS

| | | | |
|---|---|---|---|
| 3,735,396 A | 5/1973 | Getchell | 340/505 |
| 4,023,163 A | 5/1977 | Krishnaiyer et al. | 340/534 |
| 4,276,642 A | 6/1981 | Siglow et al. | 340/513 |
| 4,679,192 A | 7/1987 | Vanbrabant | 340/3.55 |
| 4,703,452 A | 10/1987 | Abrant et al. | 714/12 |
| 4,754,262 A | 6/1988 | Hackett et al. | 340/525 |
| 4,885,568 A | 12/1989 | Hackett | 340/518 |
| 4,907,222 A | 3/1990 | Slavik | 370/443 |
| 5,153,824 A | 10/1992 | Lalanne et al. | 700/79 |
| 5,400,009 A | 3/1995 | Kosich et al. | 340/331 |
| 5,446,443 A * | 8/1995 | Ishii | 340/505 |
| 5,473,771 A | 12/1995 | Burd et al. | 714/4 |
| 5,475,696 A | 12/1995 | Taniguchi | 714/775 |
| 5,535,251 A | 7/1996 | Sugawara | 375/356 |
| 5,559,492 A | 9/1996 | Stewart et al. | 340/331 |
| 5,598,139 A | 1/1997 | Karim et al. | 340/286.11 |
| 5,608,375 A | 3/1997 | Kosich | 340/293 |
| 5,668,531 A | 9/1997 | Sukegawa et al. | 340/506 |
| 5,673,252 A | 9/1997 | Johnson et al. | 370/449 |
| 5,734,329 A * | 3/1998 | Khosrowpour et al. | 340/825.21 |
| 5,751,210 A | 5/1998 | Kosich | 340/293 |
| 5,809,289 A | 9/1998 | Bae | 375/356 |
| 5,850,178 A | 12/1998 | Ha et al. | 340/512 |
| 5,886,620 A | 3/1999 | Stewart et al. | 340/332 |
| 5,959,528 A | 9/1999 | Right et al. | 340/506 |
| 5,982,275 A | 11/1999 | Kosich | 340/331 |

FOREIGN PATENT DOCUMENTS

| | | |
|---|---|---|
| GB | 2072467 A | 8/1979 |
| GB | 2295070 A | 5/1996 |

OTHER PUBLICATIONS

Search Report, British Application No. GB 9925869.1, dated Jun. 21, 2000 (counterpart application of above–identified application).

* cited by examiner

Primary Examiner—Donnie L. Crosland
(74) Attorney, Agent, or Firm—Welsh & Katz, Ltd.

(57) ABSTRACT

A communication protocol facilitates transmission at maximum rates for various types of cables. Signal to noise characteristics are improved by using voltage waveforms. The protocol can be used to transmit information between a common control unit and a plurality of spaced apart devices coupled thereto. Alternately, the protocol can be used for transmission of information between devices. The common control unit transmits clock pulses, while in a low impedance state. The devices respond to the clock pulses and transmit data on the communications link, in a low impedance state, when the common control unit has assumed a high impedance state. Clock signals and data signals are separated to improve signal to noise characteristics by transmitting same with opposite polarities. A clock detection circuit responds to the polarity of the clock pulses. A data detection circuit responds to the polarity of the data pulses. One or more features of transmitted signals can be used to implement one or more synchronized functions.

66 Claims, 7 Drawing Sheets

SYNCHRONIZED COMMUNICATION SYSTEM

This application is a continuation-in-part of application Ser. No. 09/184,409, filed Nov. 2, 1998, now U.S. Pat. No. 6,384,723 and entitled Digital Communication System and Method.

FIELD OF THE INVENTION

The invention pertains to apparatus and methods for communicating signals between processors in multi-processor systems. More particularly, the invention pertains to such systems wherein the processors communicate with one another via a communications medium as in a local area network.

BACKGROUND OF THE INVENTION

Communications circuitry for use in multi-processor systems dedicated to monitoring or supervising regions is known. One example is disclosed in Tice et al U.S. Pat. No. 4,916,432 entitled Smoke and Fire Detection System Communication. Another is disclosed in Tice U.S. Pat. No. 5,525,962 entitled Communication System and Method. Both of the noted patents are assigned to the assignee hereof and are hereby incorporated herein by reference.

While known systems are useful and have been effective, it would be desirable to be able to more completely separate data from clock signals during the communication process. Further, it would be desirable to be able to provide a substantially collision free communication environment. Such an environment would be useful in supervision or alarm systems as well as in general purpose local area networks.

SUMMARY OF THE INVENTION

A communications apparatus utilizes multi-polarity, representations for clock and data pulses. Clock pulses are transmitted from a source in a first polarity, in a communications medium as voltage pulses. The source transmits clock pulses with a low output impedance. In-between clock pulses, the source switches to a high output impedance.

At least some of the data pulses are transmitted in a second polarity, on the medium, as voltage pulses. Most of the data pulses are bracketed by pairs of clock pulses.

In one aspect data pulses, for example representing a logical "one", can be transmitted as substantially constant width pulses with logical "zero" being represented by absence of a pulse. Alternately, data can be represented as variable width voltage pulses. A logical "one" can be transmitted with a first width and a logical "zero" transmitted with another width.

In one aspect, where the source corresponds to a common control element, energy can be supplied to a plurality of spaced part units coupled to the medium, at least, when the clock pulses are being generated by the control element. In this embodiment, data can be generated by the control element, with the second polarity or by another of the units coupled to the medium.

In yet another aspect, the control element can provide framing signals for messages along with the clock pulses to synchronize communications on the line.

Further, since the clock signals and the data signals are transmitted with different polarities relative to the medium signal-to-noise characteristics are improved. For example, if the first polarity is opposite the second polarity, the respective detection thresholds can be spaced further apart from one another, i.e., +2.5 volts and −2.5 volts, respectively. Finally, the polarity of a particular pulse also identifies the type of information, clock or data, represented by the pulse.

Other advantages include:

The clocking waveform and the device data waveform will never occur at the same time. This makes it possible to implement a lockout design in the detection circuit that will tend to prevent a false clock or data detection from "ringing" on the line during the driving of the clock and data voltage waveforms.

A device wired backwards will not short out the communication wiring. The system can determine which devices are wired backwards without interference with the devices that are wired correctly. (The system may be able to communicate to such devices without having to correct the wiring under certain conditions).

The ability to differentiate from a low impedance (causing a low voltage on the line) and data.

In order to minimize "ringing and other distortions" on the wiring during communications, an adjustable waveform shape can be driven from the power source for clocking. The "slew rate" or transition rate of the voltage from one level to another can be adjusted to compensate for various wiring configuration. This will tend to minimize distortion of the waveform during communications. This waveform adjustment will be a function of:

propagation times for the signals on the wiring due to lengths and characteristic impedances of the wires, errors occurring in the communications which is monitored by every device on the loop, and waveform analysis at a central point, most likely the power source for clocking.

In yet another aspect, bytes of data can be transmitted with single intervening clock signals. Alternately, transmission can be implemented with only a single synchronizing signal followed by a string of data such as one or more bytes.

Collision free communications can be accomplished by having the devices monitor the communication line voltages while they are transmitting. Any mismatch in voltage causes a transmitting device to drop off the line and wait for the next access period to start transmitting again.

Various functions can be synchronized throughout a system using features of communications signals. These include the presence or absence of predetermined voltages or currents present on a communications link.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
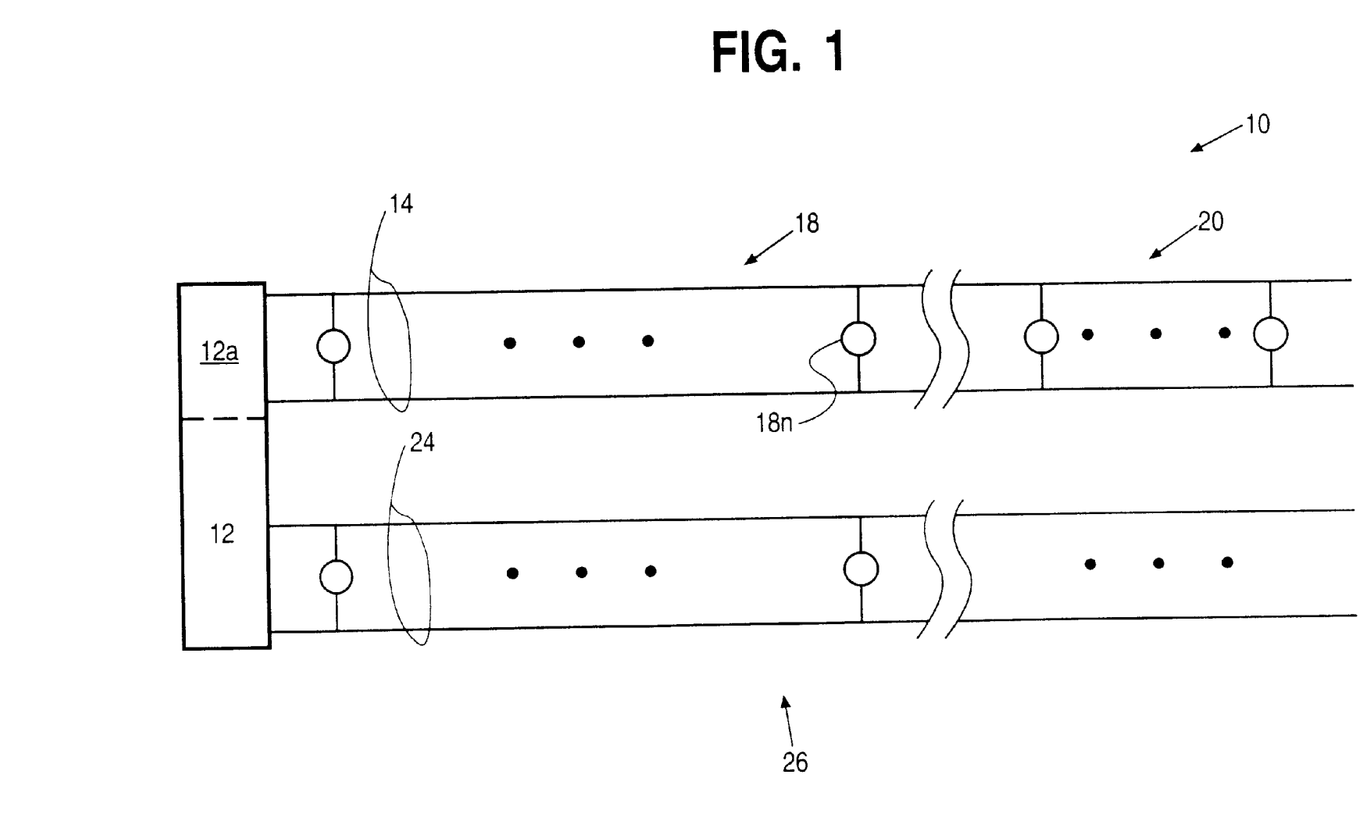
FIG. 1 is a block diagram of a system in accordance with the present invention.

FIG. 1 illustrates a system 10 which can be used for monitoring a plurality of conditions in one or more regions to be supervised. The system 10 includes a common control unit 12 which could be implemented as one or more interconnected programmed processors and associated, prestored instructions.

The unit 12 includes an interface 12a for coupling, for example, to a communications medium 14, illustrated in FIG. 1 for exemplary purposes only as an optical or electrical cable.

Coupled to medium 14 is a plurality of ambient condition detectors 18 and a plurality of control or function units 20. It will be understood that the relative arrangement of the members of the pluralities 18 and 20 relative to the medium 14 is not a limitation of the present invention. The unit 12 can communicate with members of the pluralities 18 or 20, or these members can communicate among themselves using a protocol to be discussed subsequently.

The members of the plurality 18 can include intrusion sensors, position sensors, gas sensors, fire sensors such as smoke sensors, thermal sensors or the like, and gas sensors, all without limitation. The members of the plurality 20 can include solenoid actuated control or function implementing units, display devices, printers or the like.

Also coupled to the control unit 12 via a medium 24, illustrated for example as a pair of electrical cables, is a plurality 26 of alarm indicating output devices. These could include audible or visible output devices without limitation, speech output devices and the like. The devices 26 are intended to broadcast a message, which might indicate alarm conditions, in one or more predetermined regions.

Figure 1A:
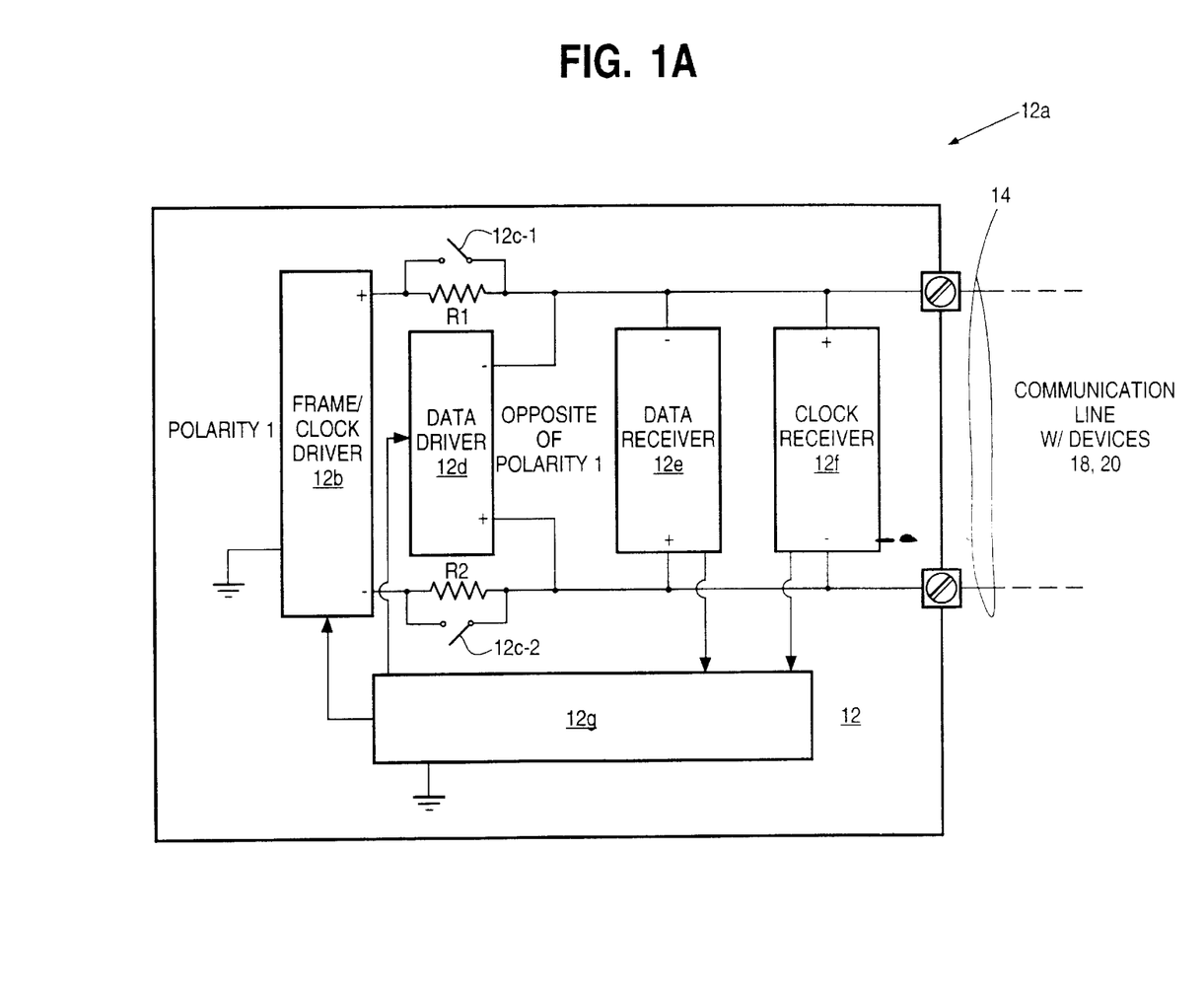
FIG. 1A is a block diagram of communication line interface circuitry.

FIG. 1A illustrates additional details of interface 12a. The interface includes frame/clock drive circuitry 12b which is coupled to controllable switches 12c-1, -2. Switches 12c-1, -2 provide a short circuit path, when closed, around relatively high impedance elements R1 and R2. Data drive circuitry 12d, data receive circuitry 12e and clock receive circuitry 12f are all coupled across communication link 14.

Interface 12a receives control signals from control element 12g which could be implemented with a programmed processor, associated preprogrammed instructions and interface circuits. It will also be understood that element 12g could receive via link 14, or any other selected input additional instructions, programs or data which could be stored therein for later execution or analysis, respectively.

In over-all operation, interface 12a via driver 12b provides framing and clock signals of a first polarity at a time when switches 12c-1, -2 are in a short circuit or closed state thereby presenting a low output impedance to the link 14. The clock receive circuitry 12f detects signal levels associated with clock pulses. It will be understood that the frame and clock signals impressed on the link 14 are voltage signals of a predetermined amplitude, for example 24 volts and 5 volts, respectively.

Interface 12a will switch to a high impedance output state, switches 12c-1, -2 effectively being open circuited, at a time when drive circuitry 12b is effectively outputting a zero volt signal. During this time interval data from units in pluralities 18 or 20 can be coupled to medium or link 14 with a second or different polarity, which could be opposite of the first polarity and received in data receive circuitry 12e. Alternately, during these time intervals interface 12a can transmit data via data drive circuits 12d to the members of the pluralities 18 or 20.

Data receive circuitry 12e includes one or more latches which retain data from the link 14 until reset. If a single latch is used, when the drive circuitry 12b sends the next clock pulse, that data latch can be reset. Resetting takes place when clock receiver circuitry 12f detects the next clock pulse. The final data value is retained in the storage element in receiver 12e and is reset at the start of the next frame. Where a plurality of data latches is provided, they could be reset simultaneously using a frame end signal.

Figure 2:
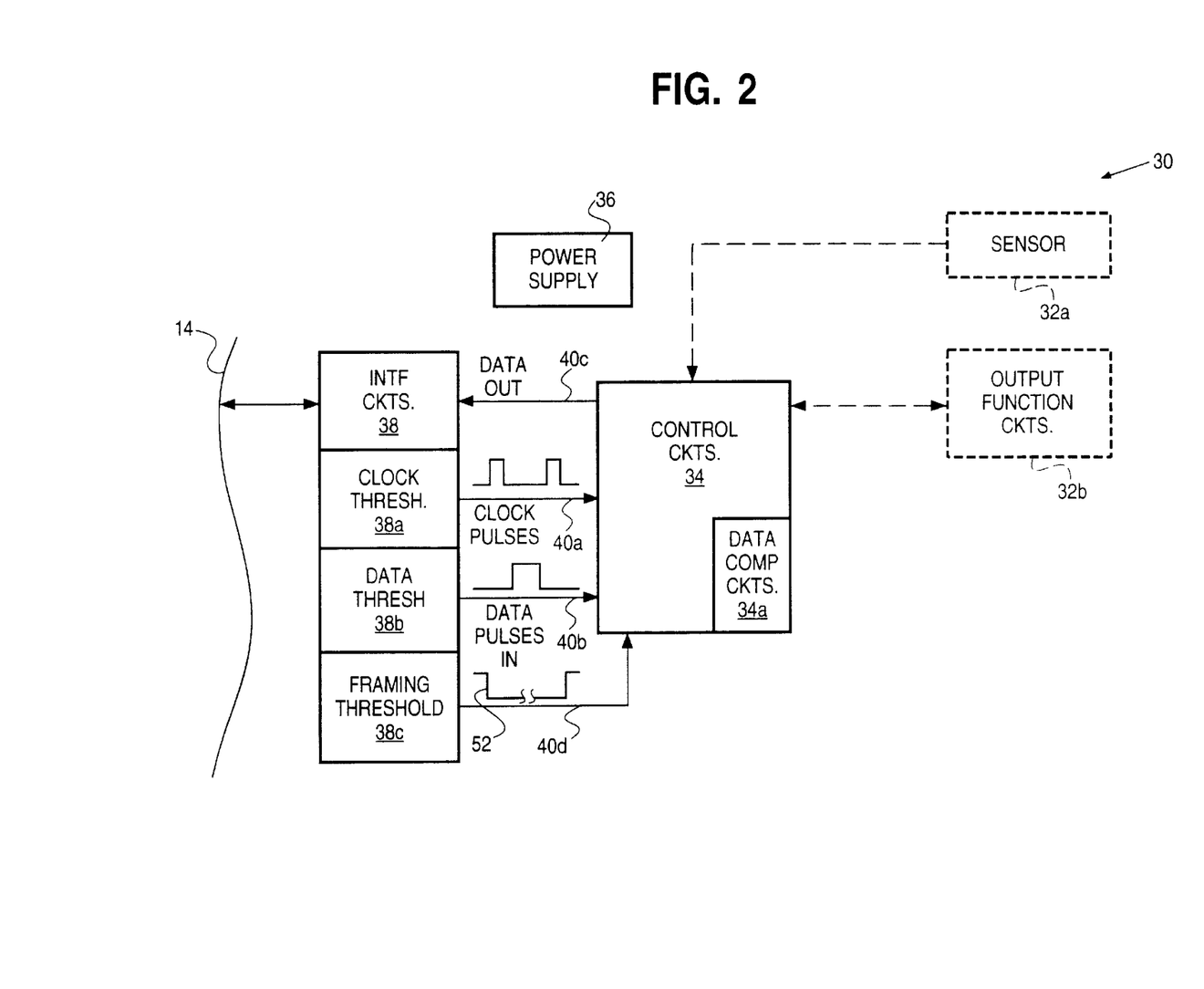
FIG. 2 is a block diagram of an electrical unit usable with the system of FIG. 1.

FIG. 2 illustrates an exemplary electrical unit 30 usable with the system 10. The electrical unit 30 could, without limitation, correspond to a member of the plurality of detectors 18. In this instance, the unit 30 would incorporate an appropriate sensor 32a, illustrated in phantom. Alternately, the unit 30 could correspond to a member of the plurality of function modules 20. In this instance, the unit 30 would include output function implementing circuitry 32b illustrated in phantom.

The unit 30 would also include control circuitry 34. The circuitry 34 could be implemented using one or more programmed processors in combination with other hardwired logic circuits. In this embodiment, prestored, executable instructions implement various sensing, processing, communicating and transducer control functions. If desired, instructions can be downloaded from another unit and stored locally.

The unit 30 also includes a power supply 36 which, is illustrated in FIG. 2, could receive electrical energy from the communications medium 14. That energy could in turn be made available to the components of the unit 30. Alternately, the unit 30 could contain a power supply energized via a battery or another source without limitation.

Unit 30 also includes an interface circuitry indicated generally at 38. The interface circuitry 38 facilitates bidirectional communication with communication signals on the medium 14. For purposes of communicating with the common control unit 12, any other member of the plurality 18 or the plurality 20 detection circuits 38a, 38b and 38c are also provided.

In accordance with the communications protocol provided on the medium 14, clock detection circuitry 38a detects those signals which have a first polarity relative to the communications medium 14. Threshold detection circuitry 38b detects those electrical signals which exhibit a second or opposite polarity relative to the medium 14. Circuitry 38c detects message framing signals.

Those signals detected by threshold circuitry 38a, clock pulses in accordance with the communications protocol system 10, can be presented on a line 40a to the control element 34. Additionally, those signals detected by circuitry 38b, in accordance with the protocol of the system 10, can be presented as data pulses on a line 40b. Control element 34 is also able to communicate via a line 40c and interface circuitry 38 with either the common control unit 12 or members of the plurality 18 or 20 without limitation.

Control circuitry 34 can also include data input/output comparison circuitry 34a. Circuitry 34a can be implemented in whole or in part using hardwired or programmed circuitry.

It will be understood that one use of the protocol herein is being discussed with respect to the system 10. However, the purpose or function of the system 10 is not a limitation of the present invention. The present protocol could be used with any distributed unit communication system without departing from the spirit and scope of the present invention.

Figure 3:
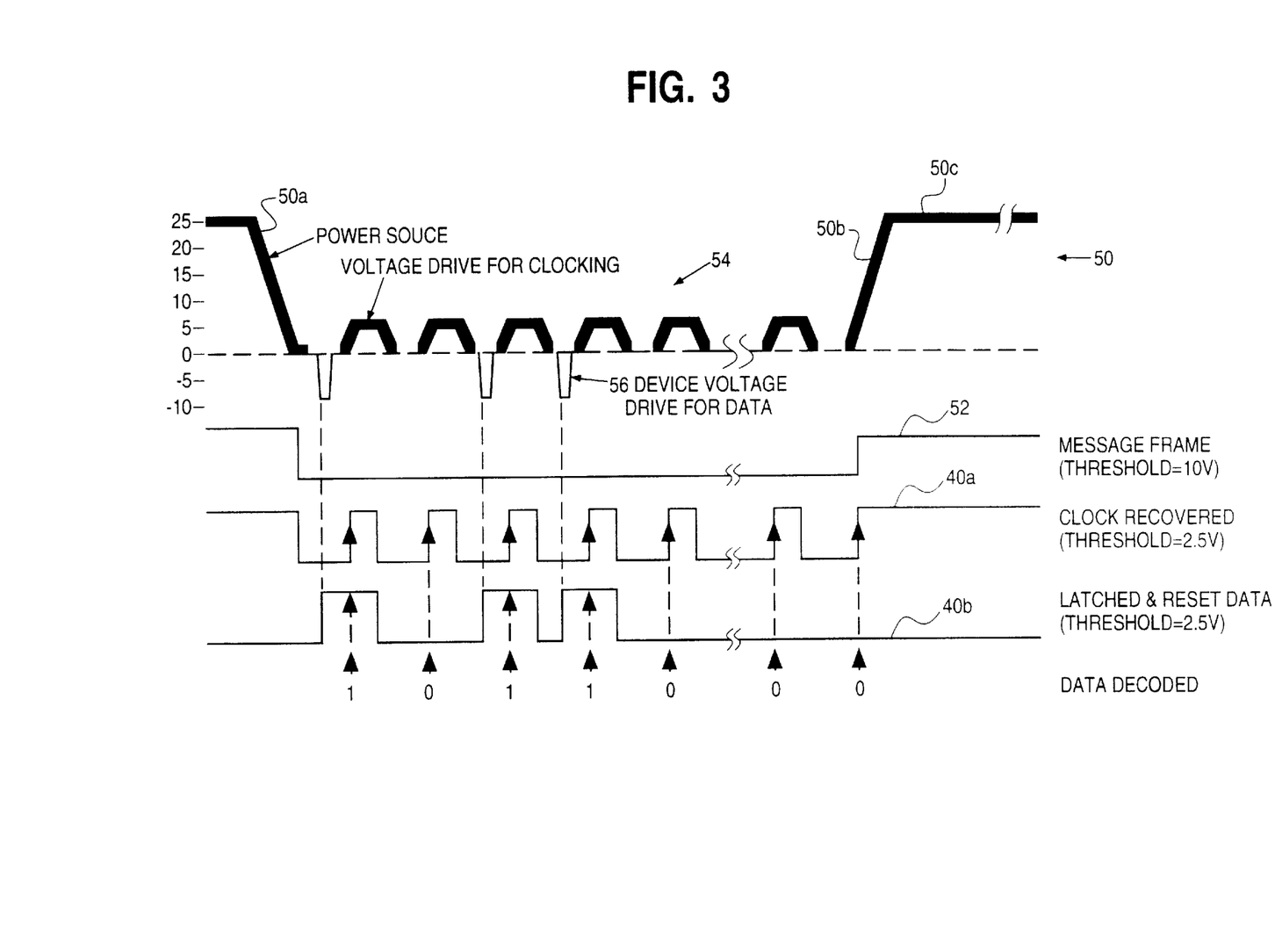
FIG. 3 is a set of timing diagrams illustrating a communications protocol usable with the system of FIG. 1.

FIG. 3 is a set of timing diagrams which further illustrates the communication protocol. A voltage signal 50 can be impressed upon the communications medium 14 by either control unit 12 or, if desired, one of the members of the pluralities 18 or 20.

The waveform 50 provides a message framing signal bounded by transitions 50a, indicating a message start and 50b indicating a message termination. Between message intervals, waveform 50, relative to the medium 14, exhibits a relatively high DC voltage level.

During inter-message intervals, waveform 50c could be coupled to the medium 14 via a power supply in unit 12 with a low output impedance. If desired, electrical energy can be supplied from the control unit 12 to the members of the pluralities 18 and 20 during these time intervals.

Interface circuitry 38c, for example in exemplary unit 30, is able to detect the start of a message indicated by framing signal 52. During a message frame, the voltage on medium 14 exhibits a relatively low value between message start transition 50a and message end transition 50b.

During the frame time interval, indicated by waveform 52, line 40d, the output power supply in the control unit 12 or any other unit which is providing framing signals must be capable of switching between high and low impedance states. As illustrated in waveform 50, the unit which is supplying synchronization signals which include the framing transitions 50a, 50b also provides a plurality of spaced apart voltage clock pulses indicated generally at 54. Clock pulses are transmitted on the medium 14 by output circuitry 12a with a low output impedance as discussed above.

During the time interval that each of the clock pulses is present on the medium 14, energy is also being supplied to those units, such as a unit 30 which have a power supply, such as power supply 36 coupled to the medium 14. The clock pulses 54 are all coupled to the medium with a first or positive polarity.

Between clock pulses, the synchronizing device assumes a high output impedance state. Other units, such as the common control unit 12 or members of the pluralities 18 or 20 can transmit voltage-type data pulses 56 on the medium 14 to be received by other members of the pluralities 18 and 20 as well as the control unit 12. During data intervals, those devices coupled to the medium 14 which are not transmitting data assume a high impedance state and can receive those data pulses. The data pulses 56 are transmitted on the medium 14 with a polarity which is different, or opposite, to the polarity of the clock pulses 54.

Impressing clock pulses on the medium 14 with a different polarity than that of the data pulses results in maximizing the receiving units' ability to separate clock and data pulses reliably. Since in the present protocol, clock signals and data signals are presented with different polarities, separation of the clock and the data can be carried out readily.

The detected polarity will determine which signals represent clock pulses and which signals represent data pulses. Additionally, the clock signals and the data signals, in accordance with the present protocol, will always occur at different time intervals. This contributes to an increased signal to noise ratio of the present system in that false clock signals or data signals resulting from ringing on the medium 14 can be rejected if the polarity of the noise signal does not correspond to the polarity of an expected clock or data signal.

The detected clock signals, present on the line 40a, and the displaced data signals, present on the line 40b, can then be coupled to control element 34 for processing at the unit 30. Alternately, the control unit 34 can generate a string of data pulses on the line 40c which can be transmitted via the medium 14 in-between clock pulses 54.

Figure 4:
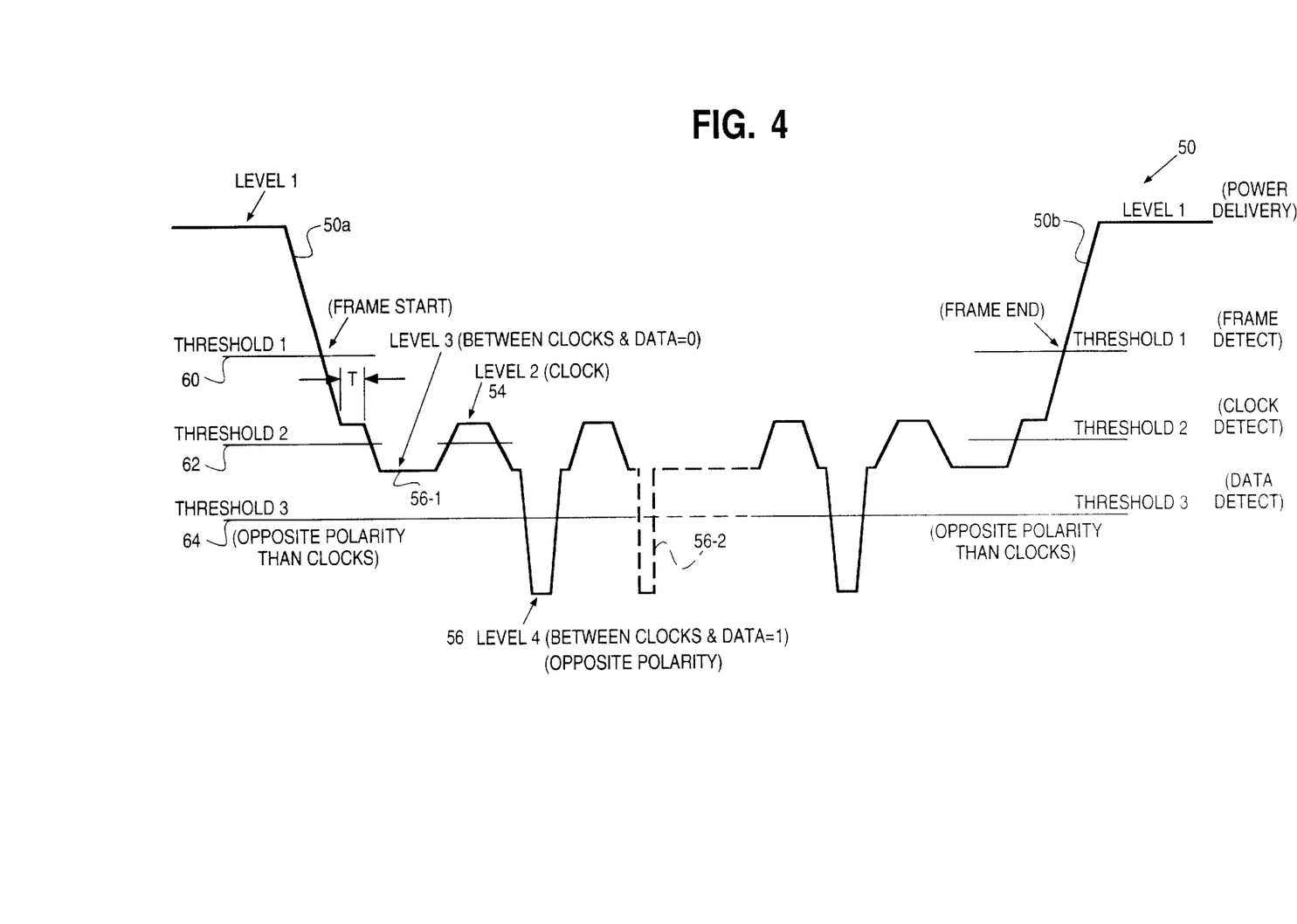
FIG. 4 is a more detailed diagram of a communication signal of FIG. 3.

FIG. 4 is a graph which illustrates further details of the signal 50 of FIG. 3. As illustrated in FIG. 4, the signal 50 exhibits a frame start/frame end threshold 60, detectable in framing threshold detection circuitry 38c. Signal 50 also exhibits a clock threshold 62 which can be used to detect the presence of the plurality of clock signals 54 via circuitry 38a.

A third threshold 64 functions to distinguish between a first polarity exhibited by the framing signals and the clock signals and a second, preferably opposite, polarity exhibited by a plurality of data signals 56. In one embodiment, where binary values are being transmitted via the medium 14, the presence of opposite polarity voltage pulses 56 could, for example, be indicative of the presence of logical 1. Logical zeros could be represented by an absence of the opposite polarity signals 56 as indicated at 56-1, FIG. 4.

Alternately, logical "one" signals can be transmitted as pulses 56 of a predetermined width. Logical "zero" can be transmitted, as indicated in phantom at 56-2, with a different width but of the same polarity as the pulses 56.

In addition, a stabilizing time interval T can be provided after frame start transition 50a and before a message starts such as before a data bit, such as 56-1, is transmitted. The stabilizing interval T can have a duration of less than 5 Msec, preferably in a range of 2–3 Msec.

Collision free communications can be enhanced by having the members of the pluralities 18 and 20 monitor the medium 14 when each respective device is carrying out a transmit operation. Detected voltage mismatches between the respective unit's intended communications sequence and that which is detected on the medium can cause the respective device to cease transmission and wait for the next framing interval to re-initiate transmission.

Circuitry 34a can compare a sequence of data output signals on line 40c to respective signals actually present on the medium 14 as detected by threshold circuitry 38b. Where a given data output pulse sequence differs from a pulse sequence present on the medium 14, that difference indicates to the respective electrical 30 that at least one other unit is attempting to communicate at the same time via medium 14.

Since a transmitting electrical unit transmits a voltage pulse, such as the pulses 56 with a low impedance output, the presence of one or more of those pulses on the medium 14 will override any respective output signals from other electrical units corresponding to, for example, a logical zero, 56-1 which are output via the respective electrical unit with a high impedance output state. Thus, the electrical unit which detects the mismatch can terminate communication temporarily until it detects a subsequent frame start signal and perhaps an associated command which will authorize further transmission on the medium 14.

The above described voltage drive protocol minimizes noise or losses due to leakage in the transmission medium 14. This would include leakage in conductive cables, wires or other sources of shunt impedance which might be present or cross the lines and not related to data transmission. By way of example, if the high level output impedance of the interface 12a corresponds to something on the order of 2000 ohms, since a transmitting electrical unit transmits at a very low output impedance state, even a shunt on the order of 100 ohms will not interfere with communications of data on the medium 14.

Thus, using the above-described protocol members of the plurality 18 can communicate information to members of the plurality 20 during message frames generated for example by common control unit 12. Alternately, and without limitation, the framing signals and clock pulses could be generated by any other electrical unit coupled to the medium 14.

It will be understood that neither the contents of the messages being transmitted nor the detailed circuitry of the members of the pluralities 18 or 20 are limitations of the present invention. It will also be understood that, if desired, the control unit 12 could, but need not, be the primary source of framing and clock signals in the system 10. In such an instance, the members of the pluralities 18 and 20 could communicate among themselves without directly communicating with the common control unit 12 but still operate within a synchronizing scheme established by that common control unit.

Figure 5:
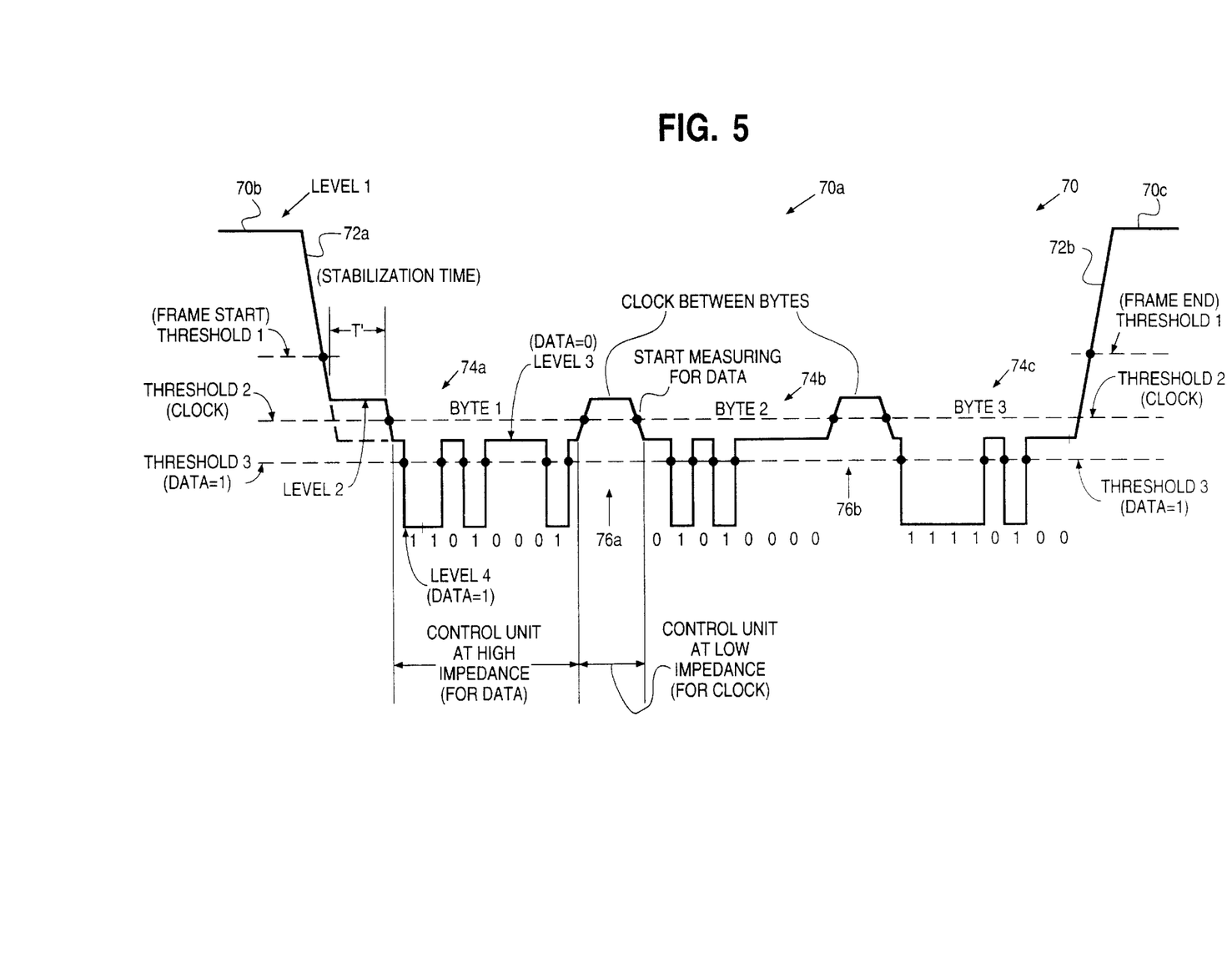
FIG. 5 is a diagram illustrating an alternate form of a communications signal.

FIG. 5 illustrates an alternate communication protocol exemplified by waveform 70. Waveform 70 includes a frame interval 70a bounded by a preframe voltage level 70b and a postframe voltage level 70c. During the preframe and postframe intervals, signals 70b, 70c provide energy to the pluralities of the devices such as devices 18 and 20.

Message frame 70a is defined by a frame start transition 72a and a frame ending transition 72b. Subsequent to frame start transition 72a, a stabilization time T' is provided. During this time interval between frame start transition 72a and any subsequent message or messages, any residual currents on the communication link 14 have an opportunity to dissipate or decrease to a level that will not interfere with communication of subsequent messages.

In the protocol of FIG. 5, a plurality of bytes 74a, 74b and 74c are serially transmitted between an end of the stabilization interval T' and frame end transition 72b. For synchronization purposes, interbyte clock pulses 76a and 76b are transmitted on the medium with a polarity opposite the polarity of the data pulses corresponding to a logical "one". Data signals corresponding to a logical "zero", as illustrated in FIG. 5, are transmitted at a level 3 amplitude.

During the stabilization time interval T' as well as during the clock pulses 76a, 76b, the source switches to a relatively low output impedance. The source then switches to a high impedance mode between clock signals thereby enabling communicating devices, such as members of the pluralities 18 and 20 to impress data signal voltage-type pulses on the link 14 with a polarity opposite that of the polarity of the clock signals.

Figure 6:
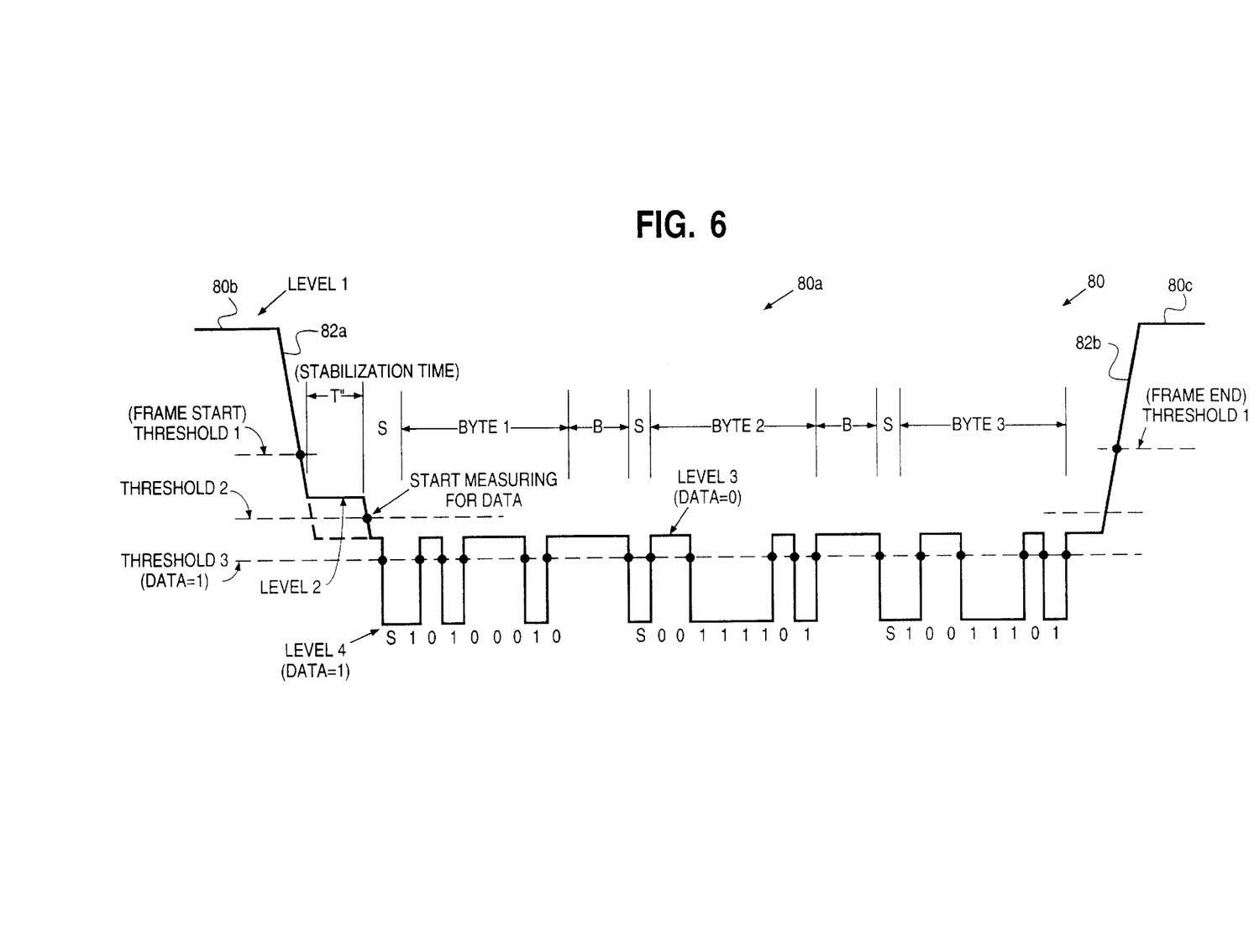
FIG. 6 is a diagram illustrating yet another form of a communications signal.

FIG. 6 illustrates via a waveform 80 an alternate communications protocol. Waveform 80 includes a message frame interval 80a which is bounded by a preframe level 80b and a postframe level 80c. During the intervals where the levels 80b, 80c are present, power can be supplied via medium 14 to the members of the pluralities 18 and 20.

Frame 80a is bounded by frame start transition 82a and a frame end transition 82b. Subsequent to frame start transition 82a, a stabilization time T" is provided, corresponding to the stabilization time interval T' discussed previously.

Unlike the protocol of FIG. 5, the protocol of FIG. 6 does not incorporate clock signals as previously discussed in FIGS. 4 and 5. Instead, at the end of stabilization interval T", a data start signal S can be detected followed by an initial byte of information, a sequence of binary one and binary zero representations. Subsequently, an interbyte interval B is provided. Interval B is followed by another start signal S and a second byte of information represented by binary one and binary zero representations. After yet another interbyte interval B and another start signal S, a third byte of information can be transmitted in the same frame. The third byte is terminated by the frame end transition 82b.

Those of skill in the art will understand that the frame start transition 82a and the frame end transition 82b can be used as an alternate to having the clock signals 76a, 76b of the waveform 70 of FIG. 5. In this instance, frame start transition 82a could also enable a local clock of an appropriate frequency for clocking data signals.

In another embodiment of the invention, the control unit, or other synchronizing device coupled to the link, transmits a waveform that is used by devices, such as devices 18n, 20n and 26n, coupled to the communication link or links 14 or 24 for timing the functions of the respective device(s). These functions can, for example and without limitation, include:

a) determining when to sample the sensor values;
b) determining when to start sending a message on the communication link;
c) determining when to perform a processing step;
d) determining when to output a signal to other devices;
e) determining when to alter an output for example to turn it ON or OFF; and
f) determining when to advance an internal clock or counter value.

In a preferred embodiment, the control unit 12 transmits a waveform/message frame with start and end indicators such as 72a, 72b, FIG. 5. Either the control unit 12 or a device inserts a message in the message portion of frame.

If the message is not in error, the devices will advance their time counters. This message frame can be transmitted, for example, every 0.25 seconds and is received by all devices on the respective communication link. Real-time values can also be downloaded to the devices so that they can update their respective timers in relationship to the latest real times stored from the downloaded times.

The predictability of this waveform/message can be used to initiate or synchronize a variety of functions at one or more devices coupled to one or more communications links. The following is exemplary and not limiting.

Sampling the sensor values: A selected device can count the transmitted waveform/messages from the control unit and samples the sensor when the number reaches 20 (5 seconds for 0.25 second intervals per waveform/message). It then resets the counter and starts counting again per the local programmed instructions.

Start sending a message: At the start of the transmitted waveform, the devices initiate a time internal to determine when to start sending a message. All devices will start transmitting at the same time. Bit arbitration can be used to selectively permit the highest priority message to be properly transmitted without the occurrence of collisions.

To perform some processing step: The devices may have a capability to locally process certain signals. For example, it may be desired to process a series of stored sensor values using an algorithm programmed into the device's processor. The device, to implement this function could count 40 transmitted waveform/messages from the control unit at 0.25 seconds per waveform/message. The stored sensor values could then be processed.

To output a signal to other devices: Devices can directly communicate with one another and may need to receive a signal to carry out a function that is to be coordinated in time. For example, a device 18i implemented as an ambient condition detector might detect a selected condition. Device 18i in turn might want to communicate a command to a module 20j configured as an output module. The device 18i could count the transmitted waveform for a specific count number and then output the command signal to the device 20j at the appropriate number of counts.

When to adjust an output: Devices can receive a message from other devices to which they are then to respond by adjusting an output, for example, by turning it ON or OFF. The devices can time their adjusting of the respective output or outputs using waveforms transmitted on the communication link in accordance with their respective programmed instructions. The programmed instructions could include, for example a sequence of ON/OFF events in representing a specific pattern or code (i.e. audio-visual coded indicators). Effectively, the devices will all respond at the same time and be synchronized. Their internal programs would also be synchronized. The devices could also receive a waveform/message from the control unit to which they are to then respond by turning on or off an output. Again, the devices will time turning the respective output(s) ON or OFF to the waveform/message transmitted. Hence, they will always be synchronized.

Advancing an internal clock in the device: A real-time value can be downloaded periodically to the devices. The transmitted waveform for providing timing to the devices could then be counted to update the timer in the device, for example, the downloaded time (24 hour clock) could be 01:00:00:00 (hour:minute:second:hundred:second). The devices each update their respective timer by advancing it 0.25 second per each transmitted waveform/message used for timing. A very accurate clock can be maintained and the control unit periodically downloads new time values to keep the system synchronized. Each time a new time is downloaded, the counters for advancing the timers are reset, thus synchronizing all devices to the new real time.

Several different embodiments are possible. A feature(s) of the continuously and periodically transmitted waveform or message from the control unit or other device that is/are used for timing can include:

a) Voltage threshold detection at the devices. When the waveform crosses that threshold, a timer is advanced in each of the respective devices.
   1) Multiple threshold detection at the devices. A series of thresholds must be crossed before a timer, or the time, is advanced in the respective devices.
   2) A time constraint(s) at the device(s). Only thresholds crossed within specific time limits are used for timing the respective devices.

b) A current pulse or draw at periodic times can be used to synchronize the timing of devices if they are capable of detecting that current pulse on the communication line.

c) A periodic message sent by the control unit or other designated device can be used for advancing timer(s) in the respective devices.
   1) Any bit or combination of bits could be used for the synchronization function.
   2) A specific message can be used for synchronizing.
      This message may be the same message that is periodically sent.
      This message may vary and be a time indicating message.

d) A periodic timed message can be transmitted by devices and can be used for the timing function in devices thereby synchronizing all the devices. This message could be a specific timing message or any selected message if the messages are only allowed to be transmitted at periodic time intervals. For example, the devices may have staggered fixed periods during which to transmit "I'm OK" messages and every periodic time there is some message being transmitted.

e) A periodic timed cooperative message in which part is transmitted by the control unit, or other designated device and part is transmitted by a device(s) can be used for the timing function in devices.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A communication apparatus comprising:
   a source;
   a multi-conductor communications medium, coupled to the source, wherein the source includes drive circuitry for impressing on at least one of the conductors of the medium a plurality of spaced apart, synchronization signals;
   at least one electrical device, coupled to the medium, wherein the device includes receiver circuitry for detecting the synchronizing signals and for generating in the device electrical signals responsive thereto, wherein the device further includes transmitter circuitry for producing a plurality of spaced apart, data pulses on the at least one conductor.

2. An apparatus as in claim 1 wherein the source comprises a source of voltage-type clock pulses of a first polarity and wherein the data pulses are produced by the device as voltage pulses with a second polarity.

3. An apparatus as in claim 2 wherein, the device includes circuitry for establishing a common datum and wherein relative, to the common datum, the first polarity is the opposite of the second polarity.

4. An apparatus as in claim 1 wherein the source includes circuitry for generating voltage clock pulses with a relatively low output impedance and for switching to a relatively high output impedance between clock pulses.

5. An apparatus as in claim 4 wherein the generating circuitry includes circuitry for generating first and second spaced apart bounding waveforms with the clock pulses positioned therebetween.

6. An apparatus as in claim 2 wherein the synchronizing signals comprise selected transitions of voltage pulses.

7. An apparatus as in claim 2 wherein the synchronizing signals comprise selected current values.

8. An apparatus as in claim 2 wherein the synchronizing signals comprise a plurality of spaced apart messages transmitted to the device.

9. An apparatus as in claim 1 wherein the device includes circuitry for transmitting data pulses to another device.

10. An apparatus as in claim 9 which includes a second electrical device, coupled to the medium, wherein the second device includes circuitry, responsive to the synchronizing signals and to the data pulses from the first device to carry out a predetermined, synchronized, function.

11. An apparatus as in claim 10 wherein one device comprises a condition detector and another device comprises an output function module.

12. An apparatus as in claim 11 wherein the source comprises a source of frame defining voltage pulses.

13. An apparatus as in claim 11 wherein the condition detector comprises one of a fire detector and a gas detector and the output function module comprises one of a visual alarm indicating output device and an audible alarm indicating output device.

14. A system as in claim 1 wherein the electrical device comprises an ambient condition detector which includes circuitry for detecting an ambient condition and for transmitting alarm indicating data pulses indicative thereof on the medium; and
 a plurality of output devices, coupled to the medium, for emitting at least one of an audible alarm signal and a visible alarm signal in response to the alarm indicating data pulses wherein the output devices emit in synchronism in response to the synchronization signals.

15. A communication apparatus comprising
 a voltage drive source;
 at least a two-wire medium for communication, coupled to the source, wherein the source includes drive circuitry for impressing on the medium a plurality of spaced apart, voltage-type clock pulses of a first polarity across two of the wires and a plurality of synchronizing signals;
 an electrical device, coupled to the medium, wherein the device includes circuitry for detecting the voltage-type clock pulses and the synchronizing signals and for generating in the device electrical signals responsive thereto;
 wherein the device contains an energy source; and
 wherein the device further includes transmitter circuitry for driving the medium, from the energy source in the device, with a plurality of spaced apart voltage-type data pulses, and having a second, different polarity across the two wires.

16. An apparatus as in claim 15 wherein the source includes circuitry for generating at least one of voltage-type synchronizing signals, synchronizing current signals, and, synchronizing messages.

17. An apparatus as in claim 15 wherein the device includes circuitry which establishes at least one threshold detection level and includes circuitry coupled thereto to detect the synchronizing signals.

18. An apparatus as in claim 15 which includes a second device, wherein the devices include circuitry for transmitting messages therebetween.

19. An apparatus as in claim 18 wherein one device comprises a detector having a sensor and another device includes a module having an output transducer wherein the transducer is energized in time in accordance with the synchronizing signals.

20. In a communication system, a method of communicating comprising:
 providing a start-frame indicator by altering a line voltage of a first polarity relative to a predetermined value;
 providing a predetermined synchronizing signal;
 generating clock pulse voltages with the first polarity and an amplitude that is different than the start frame indicator;
 sending data pulses of a different polarity during the high impedance period of time;
 providing an end-frame indicator for the message by returning the line voltage to the predetermined value.

21. A method as in claim 20 which includes:
 detecting the synchronizing signal at one device and in response thereto generating a message, in the form of data pulses, to a different detector.

22. A method as in claim 21 where the devices exhibit a high impedance unless a selected device is transmitting a data pulse.

23. A method as in claim 20 wherein the provided synchronizing signal comprises at least one voltage transition.

24. A communication system having a bidirectional communications medium comprising:
 a plurality of electrical units wherein the medium enables a selected unit to communicate and at least some of the units each include communications interface circuitry, couplable to the medium, wherein that circuitry selectively exhibits a first output impedance and a second, lower output impedance wherein the interface circuitry includes drive circuitry for impressing a selected signaling voltage on the medium with the second output impedance; circuitry for detecting synchronizing signals; and detection circuitry for comparing a voltage on the medium to a voltage expected to be present on the medium and for terminating unit communication, at least temporarily, in response to a difference therebetween.

25. A system as in claim 24 wherein at least some of the units include programmed control circuitry for receiving a multi-state data bit sequence from the interface circuitry in conjunction with the synchronizing signals.

26. A system as in claim 25 wherein at least some of the units include output audible or visible alarm transducers.

27. A system as in claim 26 wherein the control circuitry, in at least some of the units, includes a programmed processor.

28. A communication system comprising:
 a source;
 a multi-conductor communications medium, coupled to the source, wherein the source periodically impresses synchronization signals on one of the conductors of the medium; and
 at least one electric device, coupled to the medium, wherein the device(s) detect the synchronizing signals for timing device functions, wherein the source and/or the device(s) can transmit at least one type of message on the one conductor; and wherein said synchronization signals are independent of the type of messages transmitted.

29. A system as in claim 28 wherein the synchronization signals are transmitted by the source at predetermined, fixed intervals.

30. A system as in claim 28 wherein a counter in at least the one device is incremented each time a synchronization signal is received.

31. A system as in claim 30 wherein a real time value can be downloaded or otherwise transferred into the at least one device from another device and this action automatically sets the counter in the device to a predetermined value and wherein at least some of the devices on the communications medium are synchronized in real time and in counter value.

32. A system as in claim 28 wherein the device includes a programmed processor for executing device functions.

33. A system as in claim 28 wherein some of the devices on the communication medium are output devices and provide a signal at an output that is timed to the synchronization signal received from the communication medium.

34. A system as in claim 28 wherein the device includes circuitry for the storage and updating of real time clock values.

35. A system as in claim 28 wherein the device includes an ambient condition sensor.

36. A system as in claim 35 wherein the device includes circuitry for sampling of at least one sensor value(s) and associated processing of the sensor value(s) for the determination of an ambient condition.

37. A system as in claim 33 wherein at least some of the output devices include preprogrammed instructions that will output a specified ON/OFF signal in response to the synchronization signals transmitted by the source.

38. A system as in clam 36 wherein the processing includes drift compensation to maintain a sensitivity setting in response to changing characteristics of the device.

39. A system as in claim 30 wherein the synchronization signal is detected by circuitry in the device responsive to one of the signals crossing a predetermined threshold, crossing a predetermined threshold more than once and crossing more than one predetermined threshold before the counter is incremented.

40. A system as in claim 39 wherein only thresholds crossed within specific time limits are used for incrementing the counter.

41. A system as in claim 39 wherein the signal is a voltage waveform.

42. A system as in claim 39 wherein the signal is a current waveform.

43. A system as in claim 39 wherein the devices derive the synchronization signals by detecting messages transmitted on the communication medium.

44. A system as in claim 43 wherein at least one message is transmitted at periodic fixed intervals.

45. A system as in claim 43 wherein one of a selected bit or a selected combination of bits within a message comprises the synchronization signal.

46. A system as in claim 43 wherein only selected messages that are transmitted with a predetermined quality characteristic comprise synchronization signals.

47. A system as in claim 43 wherein messages may be transmitted on the communication medium by the devices.

48. A system as in claim 43 wherein the messages may include information from multiple devices sending messages sequenced in time.

49. A system as in claim 28 wherein the medium includes at least one of a line carrier, RF, dedicated communication lines, and conductors that also deliver power to devices.

50. A system as in claim 28 wherein the source receives a synchronization signal from another source.

51. A communication method comprising:

providing a multi-conductor communications medium;

periodically impressing synchronization signals on the medium;

transmitting at least one type of message on the communication medium; and coupling at least one electric device to the medium, wherein the device detects the synchronizing signals, and using the signals for timing device functions.

52. A method as in claim 51 wherein the synchronization signals are transmitted at predetermined fixed intervals.

53. A method as in claim 51 wherein counters in the devices increment each time a synchronization signal is received.

54. A method as in claim 53 wherein a real time value can be downloaded or otherwise transferred into the devices from a control unit, automatically setting the counters in the device to a predetermined value so all devices on the communications medium are synchronized in at least counter value.

55. A method as in claim 51 wherein devices on the communication medium that are output devices provide a signal at their output that is timed to the synchronization signal received from the communication medium.

56. A method as in claim 54 wherein the device functions include updating and storing of real time clock values.

57. A method as in claim 51 wherein the device functions include the sampling of at least one sensor value(s) and associated processing of the sensor value(s) for the determination of an ambient condition.

58. A method as in claim 57 wherein the said processing includes drift compensation to maintain the sensitivity setting as the device ages.

59. A method as in claim 53 wherein the synchronization signal is detected by the waveform crossing one of a predetermined threshold, and more than one predetermined thresholds before the counter is incremented.

60. A method as in claim 59 wherein only thresholds crossed within specific time limits are used for incrementing the counter.

61. A method as in claim 51 wherein the synchronization signals are derived by the devices detecting messages transmitted on the communication medium.

62. A method as in claim 61 wherein at least one message (s) is transmitted at periodic fixed intervals.

63. A method as in claim 61 wherein any bit or combination of bits within a message can be used as the synchronization signal.

64. A method as in claim 61 wherein only messages that are transmitted without error are used for synchronization signals.

65. A method as in claim 61 wherein the messages may be transmitted on the communication medium by the devices.

66. A method as in claim 61 wherein the messages comprises a composite message from multiple devices sending messages sequenced in time.

* * * * *